US008833531B2

(12) United States Patent
Richardson et al.

(10) Patent No.: US 8,833,531 B2
(45) Date of Patent: Sep. 16, 2014

(54) BRAKE FLUID COOLING SYSTEM

(76) Inventors: Del Richardson, Gainesville, VA (US); Harry H. Richardson II, Rosemond, CA (US); Phillip T. Carter, Lancaster, CA (US)

( * ) Notice: Subject to any disclaimer, the term of this patent is extended or adjusted under 35 U.S.C. 154(b) by 0 days.

(21) Appl. No.: 11/015,530

(22) Filed: Dec. 17, 2004

(65) Prior Publication Data

US 2006/0131952 A1    Jun. 22, 2006

(51) Int. Cl.
*F16D 65/853* (2006.01)
*B60T 13/74* (2006.01)
*F16D 65/78* (2006.01)

(52) U.S. Cl.
CPC ........ *F16D 65/853* (2013.01); *F16D 2065/782* (2013.01)
USPC ................... 188/264 P; 188/264 R; 188/352; 303/10

(58) Field of Classification Search
USPC ............. 303/3, 10, 15, 59, 80, 84.2; 188/352, 188/361, 264 R, 71.6, 264 F, 264 CC, 264 P
See application file for complete search history.

(56) References Cited

U.S. PATENT DOCUMENTS

| 2,406,304 | A | | 8/1946 | Lucien |
| 2,917,137 | A | | 12/1959 | Kelley |
| 2,934,382 | A | | 4/1960 | Casler |
| 2,944,618 | A | * | 7/1960 | Schjolin ........................ 180/54.1 |
| 2,946,412 | A | | 7/1960 | Jensen |
| 2,986,240 | A | | 5/1961 | Eaton |
| 3,590,559 | A | * | 7/1971 | Bragg et al. ..................... 96/174 |
| 3,608,681 | A | | 9/1971 | Schlor |
| 3,658,387 | A | | 4/1972 | Roper |
| 3,765,729 | A | * | 10/1973 | Toomey ........................... 303/13 |
| 4,014,410 | A | * | 3/1977 | Bryant ......................... 188/71.6 |
| 4,256,350 | A | | 3/1981 | Hoefer |
| 4,706,459 | A | | 11/1987 | Burckhardt |
| 4,799,575 | A | | 1/1989 | Kroniger |
| 4,828,089 | A | | 5/1989 | Collins et al. |
| 5,007,687 | A | * | 4/1991 | Kircher et al. ............. 303/113.1 |
| 5,135,353 | A | | 8/1992 | Westhoff |
| 5,152,586 | A | | 10/1992 | Burgdorf |
| 5,445,242 | A | | 8/1995 | Pogorzelski |
| 5,954,166 | A | | 9/1999 | Maeda |

(Continued)

FOREIGN PATENT DOCUMENTS

| DE | 3143267 | 10/1981 |
| FR | 2630071 A1 | 10/1989 |
| GB | 2079393 | 1/1982 |
| JP | 401022657 | 1/1989 |

OTHER PUBLICATIONS

PCT/US2005/045804, International Search Report, Mar. 17, 2006 (3pp).
PCT/US2005/045804, Written Opinion, Mar. 17, 2008 (5pp).

(Continued)

*Primary Examiner* — Melody Burch

(57) ABSTRACT

The brake fluid cooling systems may be used for cooling the brake fluid in a hydraulic brake system. A pump may have an outlet port in fluid communication by a first conduit with a pressure port of a brake wherein there may be a check valve in the first conduit oriented to allow flow from the pump and not to the pump. A bleed port of the brake in fluid communication with a master brake cylinder. The master brake cylinder in fluid communication with an inlet port of the pump.

5 Claims, 2 Drawing Sheets

(56) References Cited

U.S. PATENT DOCUMENTS

| | | |
|---|---|---|
| 6,041,898 A | 3/2000 | Maeda |
| 6,386,333 B1 | 5/2002 | Russell |
| 2006/0131952 A1 | 6/2006 | Richardson et al. |

OTHER PUBLICATIONS

PCT/US2005/045804 Jun. 22, 2006 (9pp).
PCT/US2005/045804, International Preliminary Report on Patentability, Jun. 19, 2007 (6pp).

* cited by examiner

BRAKE FLUID COOLING SYSTEM

BACKGROUND OF THE INVENTION

This invention relates to apparatus for cooling the brake fluid in vehicle hydraulic brake systems. The new brake fluid cooling system for disk or drum brake systems may include a pump to circulate the brake fluid through brake calipers or wheel cylinders, a master cylinder and a heat exchanger with the pressure port and bleed port of the calipers as the input port and output port for brake fluid flow through calipers or wheel cylinders.

The cooling of brake fluid in vehicles brake systems may have been accomplished by a variety of methods in the past. Examples may include high speed pumped flow of brake fluid in a circulating system, or addition of brake lines and check valves with or without cooling devices. All of these devices may have required specially designed calipers to accommodate the extra ports or cooling conduits necessary to support the particular cooling system operational design.

SUMMARY OF THE INVENTION

The present invention is directed to apparatus for cooling the brake fluid in a hydraulic brake system. A pump may have an outlet port in fluid communication by a first conduit with a pressure port of a brake wherein there may be a check valve in the first conduit oriented to allow flow from the pump to the brake and to inhibit flow from the brake to the pump. A bleed port of the brake in fluid communication with a master brake cylinder. The master brake cylinder in fluid communication with an inlet port of the pump.

These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
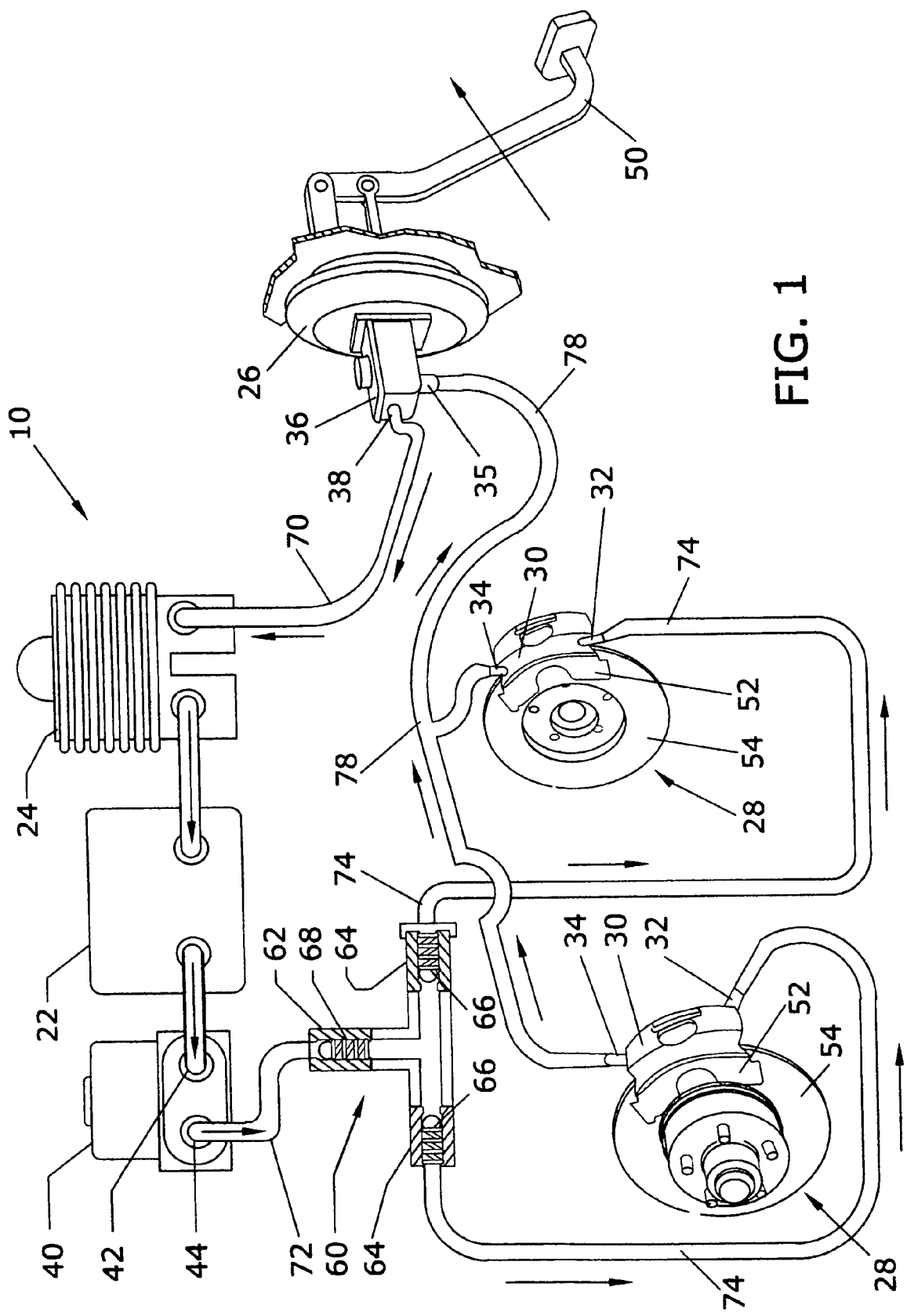
FIG. 1 illustrates the brake fluid cooling system in a nonbraking condition according to an embodiment of the invention.

Referring to FIG. 1, the brake fluid cooling system 10 may have a pump 40, reservoir 22 and heat exchanger 24 in serial fluid communication with a vehicle master brake cylinder 26 and a pair of disk brakes 28. While two disk brakes 28 may be illustrated that may be used for the front wheels of a vehicle, other configurations of braking apparatus may also be understood as being functional with the brake fluid cooling system 10, for example, wheel cylinder or drum brakes.

Generally the calipers 30 of a disk brake 28 may have a pressure port 32 and a bleed port 34. For normal vehicle braking operation a master brake cylinder 26 will be in fluid communication with each caliper 30 through a conduit connected to the pressure port 32. When the brake pedal 50 may be activated, brake fluid pressure causes the calipers 30 to engage the brake pad mechanism 52 with a rotor 54 or disk causing a friction contact and a braking or slowing of a vehicle. The bleed port 34 is normally used to bleed any air from a brake system for proper braking operation.

The pressure ports 32 and bleed ports 34 may be used in a brake fluid cooling system 10 to allow circulation of brake fluid in a fluid communication system during nonbraking operation. The bleed ports 34 may be in direct fluid communication with a master brake cylinder 26 using the original brake pressure fluid lines or conduit 78. The master brake cylinder 26 may also be in fluid communication with a pump 40, a reservoir 22 and a heat exchanger 24 connected in series and the pump 40 may be in fluid communication with the pressure ports 32.

There may be a "T" type fluid connector 60 with one input port 62 and two output ports 64. The outlet port 44 of pump 40 may be in fluid communication by conduit 72 with input port 62. The output ports 64 may be in fluid communication by conduits 74 to pressure ports 32. The fluid connector 60 may have check valves 66, 68 oriented to allow fluid flow in the direction of the pressure ports 32 during nonbraking operation and to inhibit flow toward the outlet port 44 of the pump 40 during braking operation. The check valves may also be connected in line with the conduits 72, 74 rather than in the fluid connector 60.

To install the brake cooling system 10 in an existing vehicle brake system that may be a disk or drum brake system, the bleed port 34 bleed device may be removed and the existing brake pressure lines may be disconnected from pressure ports 32 and connected to bleed ports 34. The brake fluid reservoir 36 may be tapped and a reservoir port 38 created to connect conduit 70 between reservoir port 38 and the heat exchanger 24. The pump 40 may then be connected to fluid connector 60 that may then be connected to the original pressure ports 32.

Figure 2:
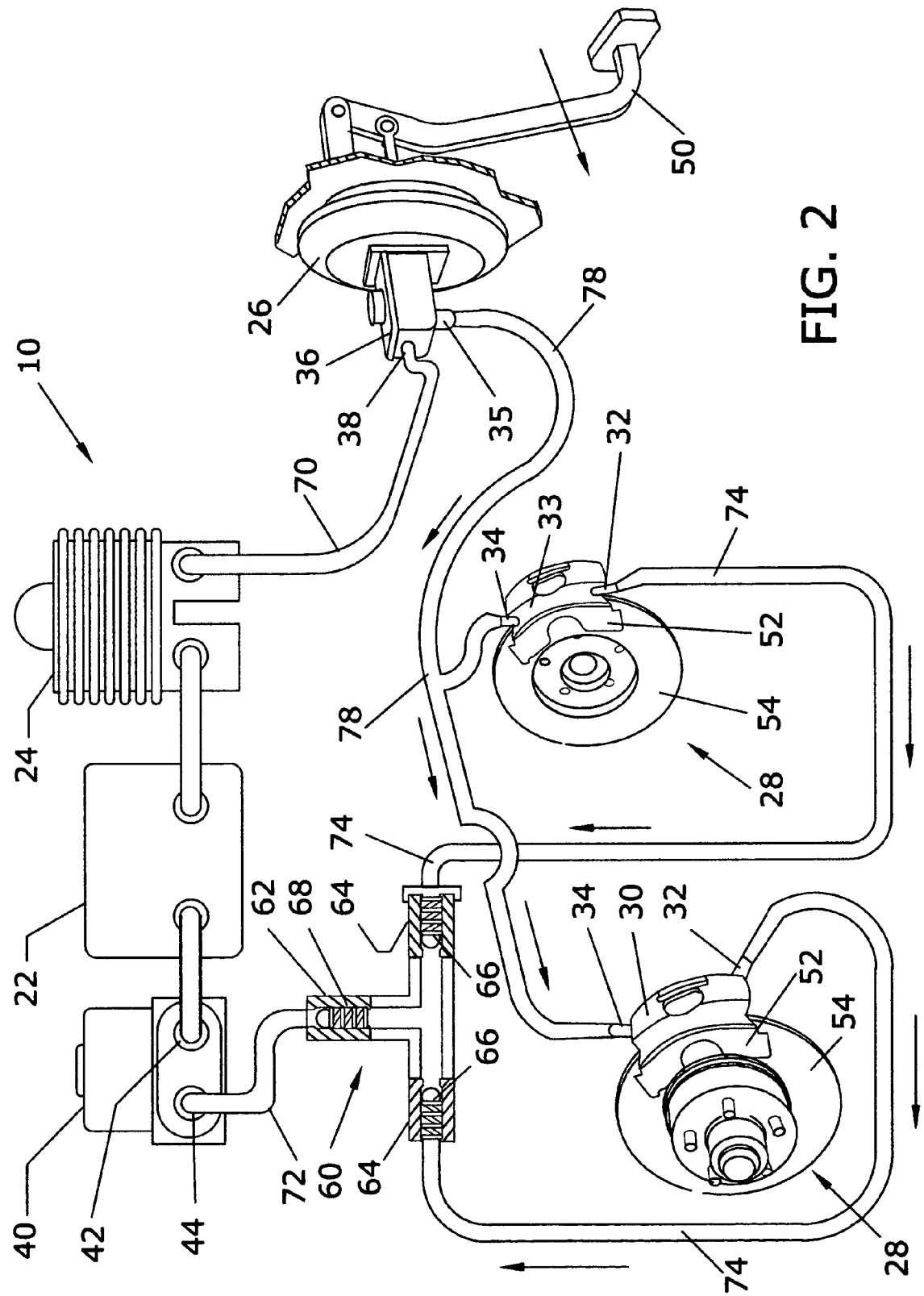
FIG. 2 illustrates the brake fluid cooling system in a breaking braking condition according to an embodiment of the invention.

Referring to FIGS. 1 and 2, the brake fluid cooling system 10 in operation may allow brake fluid system circulating flow in one direction as best viewed in FIG. 1 and inhibit circulating flow to facilitate braking as best viewed in FIG. 2. With brake peddle pedal 50 disengaged, pump 40 may operate to move brake fluid in a continuous flow through the elements of the brake cooling system 10. This flow may be a low pressure volume flow that may allow cooling of the brake fluid both due to the flow and the use of a heat exchanger. This may mitigate the potential for overheating or boiling of the brake fluid that might be caused by braking conditions that may cause elevated temperatures in the disk brakes 28.

When the brake pedal 50 may be activated the master brake cylinder 26 may force brake fluid through brake pressure port 35 into conduit 78 thereby increasing pressure in the hydraulic system. This may cause check valves 66 to seat and inhibit circulating flow that may result in activation of calipers 30 to engage the disk brakes 28 to brake a vehicle. Once the brake pedal 50 is released, brake fluid pressure may drop sufficiently to release check valves 66 to allow circulating flow. The check valve 68 may serve as a back up or safety valve in case of failure of one of check valves 66.

The brake fluid cooling system 10 may be implemented for existing brake systems as it uses the existing bleed port of disk brakes. The system may also not interfere or compromise a vehicle automatic braking or traction control system. The system may also serve to self bleed the brake fluid and prime the brake system for operation.

While the invention has been particularly shown and described with respect to the illustrated embodiments thereof, it will be understood by those skilled in the art that the foregoing and other changes in form and details may be made therein without departing from the spirit and scope of the invention.

CALL OUT LIST FOR DRAWING ELEMENTS 10 brake fluid cooling system
22 reservoir
24 heat exchanger
26 master brake cylinder
28 disk brakes
30 calipers
32 pressure port
34 bleed port
35 brake pressure port
36 brake fluid reservoir
38 reservoir port
40 pump
42 inlet port
44 outlet port
50 brake pedal
52 brake pad mechanism
54 rotor
60 fluid connector
62 input port
64 output port
66 check valve
68 check valve
70, 72, 74, 76, 78 conduit

We claim:

1. An apparatus for cooling the brake fluid in a hydraulic brake system of a vehicle comprising:
 a pump having an outlet port in communication by a first conduit with a first pressure port of a brake, wherein said brake is a dual brake system having a first brake and a second brake, and wherein there is a first check valve disposed in said first conduit oriented to allow a brake fluid flow from said pump to said dual brake system and to inhibit flow from said dual brake system to said pump;
 a bleed port of said dual brake system in fluid communication with a master brake cylinder;
 said master brake cylinder in fluid communication with an inlet port of said pump;
 a fluid connector having an input port connected to said first conduit;
 a first output port of said fluid connector in fluid communication by a second conduit to said pressure port of said first brake and a second output port of said fluid connector in fluid communication by a third conduit to a second pressure port of said second brake;
 a second check valve disposed in said second conduit oriented to allow said brake fluid flow from said first output port to said first brake and to inhibit flow from said first brake to said pump; and
 a third check valve disposed in said third conduit oriented to allow said brake fluid flow from said second output port to said second brake and to inhibit flow from said second brake to said pump.

2. The apparatus as in claim 1 wherein said fast check valve, said second check valve and said third check valve are disposed in said fluid connector that is in fluid communication with said first conduit, said second conduit and said third conduit.

3. An apparatus for cooling the brake fluid in a hydraulic brake system of a vehicle comprising:
 a pump having an outlet port in communication by a first conduit with an input port of a fluid connector wherein there is a first check valve disposed in said input port oriented to allow a brake fluid flow from said pump to a plurality of brakes and to inhibit flow from said plurality of brakes to said pump;
 a plurality of output ports of said fluid connector wherein each output port is in fluid communication by a conduit to a pressure port of one of said plurality of brakes;
 a bleed port of each of said brakes in fluid communication with a brake pressure port of a master brake cylinder;
 a brake fluid reservoir of said master brake cylinder in fluid communication with a heat exchanger that is in fluid communication with a reservoir that is in fluid communication with said pump; and
 a check valve disposed in each of said output ports oriented to allow said brake fluid flow from each of said output ports to said each of said brakes and to inhibit flow from each of said brakes to said pump.

4. The apparatus as in claim 1 wherein there is a heat exchanger in fluid communication intermediate said master brake cylinder and said pump.

5. The apparatus as in claim 1 wherein there is a reservoir in fluid communication intermediate said master brake cylinder and said pump.

* * * * *